United States Patent Office 3,558,725
Patented Jan. 26, 1971

3,558,725
PREPARATION OF XYLITOL
Shigeharu Kohno and Isao Yamatsu, Tokyo, and Seigo Ueyama, Saitama Prefecture, Japan, assignors to Eisai Kabushiki Kaisha, Tokyo, Japan
No Drawing. Filed Feb. 27, 1968, Ser. No. 708,496
Int. Cl. C07c 31/26
U.S. Cl. 260—635                                   1 Claim

ABSTRACT OF THE DISCLOSURE

Novel process for the preparation of xylitol by catalytic hydrogenation of a xylose-containing solution which has been obtained by hydrolyzing degradation of cotton seed hulls or husks, the process being characterized by the fact that said xylose-containing solution is directly subjected to the catalytic hydrogenation after purification through consecutive treatments of the crude solution first with an acidic cation exchange resin and then with a medium basic anion exchange resin.

This invention relates to a novel process for the preparation of xylitol from cotton seed hulls or husks through xylose. More particularly, the present invention is concerned with a novel process for the production of xylitol by direct catalytic hydrogenation of a xylose-containing solution obtained by acid hydrolyzing degradation of cotton seed hulls.

It has recently been reported as the result of study in sugar-metabolism particularly in pentose-metabolism that xylitol is effective for improvement of metabolism-abnormality in diabetes-mellitus.

It has already been proposed to obtain xylitol by hydrogenation of xylose which was prepared by hydrolyzing degradation of ligneous substances.

According to the known process, ligneous substance such as sawdust or chips is first subjected to hydrolyzing degradation by the aid of a dilute aqueous mineral acid to obtain a xylose- and other saccharide-containing solution. From the solution, the xylose is then isolated as crystals through troublesome treatment involving neutralization of the mineral acid remained in the solution, filtration, purification of the filtrate through an ion-exchange diaphragm, concentration of the thus purified solution to the extent that the xylose crystallizes out therefrom. The xylose thus recovered is finally subjected to a catalytic hydrogenation under pressure to convert it into xylitol. In the known process in which chips of wood, for example, are employed as raw material, the acid hydrolyzing degradation generally results in a poor conversion or saccharification efficiency such as at most 10–20% yield of xylose and comparatively large amount of hexose which sometimes comes up to that equals or more of the yield of xylose and also some organic acids and tarry matter.

In addition, because of the complicated steps such as abovementioned and particularly because of poor crystallyzing ability of xylose from the hydrolyzed solution coexisting with other products such as hexoses, other oligo-saccharides and the like, the known art brings a considerably low overall yield of the contemplated xylitol.

Contrary to the known art having the abovementioned drawbacks, xylitol can be obtained in a good yield such as 40% and in a relatively simple manner by carrying out the process of the present invention starting from cotton seed hulls, in which process xylose as the intermediate product is not isolated from the saccharified solution obtained by the steps of hydrolyzing degradation of the hulls.

Briefly stating, the process of the present invention is conducted by the following four consecutive steps:

The first step is a preparation of crude solution which contains predominantly xylose as the saccharification product by hydrolyzing degradation with a dilute mineral acid of cotton seed hulls which are abundantly available as waste product in the vegetable oil factory.

The second step is a purification of the crude solution by contacting first with an acid cation exchange resin and then with an anion exchange resin of medium basicity, followed by concentration of the purified solution.

The third step is a catalytic hydrogenation of the purified xylose-containing concentrate as such to form the xylitol-containing solution.

The fourth step is a recovery of the xylitol from the solution by a conventional procedure.

From the above explanation, it will be appreciated that cotton seed hulls serve as an excellent raw material for the production of xylose by acid hydrolyzing degradation; the xylose being utilized without isolation from the hydrolyzed solution directly for the production of xylitol by direct hydrogenation according to the above outlined process of the present invention.

By virtue of the use of the medium basic anion exchange resin as the acid scavenger in the step of purification of the process of the present invention, there is obtained an advantage of getting a satisfactory purification of the saccharide product without isolation from the solution. If, however, the purification of the saccharide solution is carried out by using a strongly basic anion exchange resin instead of the medium basic ion-exchange resin, an undesirable isomerization of the product would take place during the resin-treatment, although the strongly basic anion exchange resin is a preferable acid scavenger as compared with the medium basic anion exchange resin.

Following data are obtained by the comparative experiments carried out at 40° C. and at a space velocity of 2–4, i.e., the volume in liters passed through a liter of the respective resin per hour.

| Ion-exchange resin employed | Xylose content in original hydrolyzed solution, percent | Xylose content in solution after resin treatment, percent |
|---|---|---|
| Strongly basic ion-exchange resin (IRA-401) | 35–37 | 21–25 |
| Medium basic ion-exchange resin (IRA-93) | 35–37 | 32–35 |

Respective yield and purity of the xylitol obtained by the two processes in which cotton seed hulls were employed as raw material are shown as follows:

| Process employed | Raw material charged, kg. | Crystalline Xylose recovered, kg. | Xylitol recovered, kg. | Residual saccharide, percent |
|---|---|---|---|---|
| Known Art | 100 | 20–23 | 18–21 | 0.01 |
| Process of Invention | 100 | | 32–36 | 0.01 |

As is evident from the above, the process of the present invention is superior in respect of the yield of the xylitol and the simplicity of the overall processes to those of the known art.

The step of hydrolyzing degradation in the process of the present invention is conducted in accordance with the conventional manner by employing a dilute aqueous solution of strong mineral acid such as sulfuric acid, hydrochloric acid and like. It has been found that sulfuric acid has advantage over hydrochloric acid, since it is less corrosive toward the apparatus to be employed.

Representative ion-exchange resins suitable for carrying out the process of the present invention are as follows:

(a) Dowex 50–W sold by Dow Chem. Inc., and IR–120 Rohm and Hass Co. as the strongly acid cation-exchange resin:

(b) Lewatit MP–60 and Lewatit MIH–59, both sold by Bayer Aktiengesellschaft and IRA–93 sold by Rohm and Hass Co. as the medium basic anion exchange resin.

Many catalysts known for the conventional catalytic hydrogenations such as, for example, Raney nickel, active nickel supported on an inactive carrier, Raney copper, reduced cobalt and the like may suitably be employed for the high-pressure hydrogenation of the xylose to form xylitol according to the present invention.

The following specific example serves to illustrate the present invention, but is not intended to limit the scope thereof:

100 kg. of cotton seed hulls were soaked into a 0.1% aqueous sulfuric acid and the whole was heated to 80° C. for half an hour. The supernatant aqueous liquor was then removed. The cotton seed hulls thus treated were transferred to a pressure vessel which contains 200 liters of 2% sulfuric acid. Super-heated steam was introduced to the tightly closed vessel until the inner pressure of the vessel indicates 3–4 kg./cm.$^2$ gauge. The hydrolyzing degradation of the charged cotton seed hulls was continued at the inner temperature of around 130° C. for 50–60 minutes. Toward the end of this time the pressure was released and the content of the vessel was withdrawn and filtered to remove undigested solid residues. The solid residues on the filter were washed portionwise with 150 liters of hot water. The collected wash waters were combined with the filtrate. The total volume of the combined solution which contains saccharides amounted to approximately 350 liters.

The solution was passed through the first column filled with the acidic cation exchange resin IR–120 at the space velocity of 2–3. The effluent from the column was then passed through the second column filled with the medium basic anion exchange resin MP–60 at the space velocity of 2–3. The effluent from the second column was evaporated until about 50% concentration of the saccharides was obtained. To the concentrate kept in a pressure vessel were added 1 kg. of Raney nickel and the whole while shaking was hydrogenated under the hydrogen pressure of 100 kg./cm.$^2$ gauge and at 130° C. for an hour. After completion of the hydrogenation, the spent catalyst was removed by decantation and the filtrate was concentrated by evaporation. Upon cooking, 34.4 kg. of xylitol having melting point of 94°–94.5° C. were recovered which upon a thin layer chromatography showed the mono-spot, the characteristic of xylitol.

What is claimed is:

1. Process for the preparation of xylitol, comprising subjecting cotton seed hulls to hydrolyzing degradation with a dilute aqueous solution of a strong mineral acid to obtain a xylose-containing solution; purifying said xylose-containing solution by contacting first with an acidic cation exchange resin and then with a medium basic anion exchange resin; evaporatively concentrating the purified concentrated xylose-containing solution and then hydrogenating the purified concentrated xylose-containing solution at an elevated temperature in the presence of a nickel, copper or cobalt hydrogenation catalyst under high hydrogen pressure, and recovering the xylitol thus obtained.

References Cited
UNITED STATES PATENTS

| | | | |
|---|---|---|---|
| 2,450,586 | 10/1948 | Dunning et al. | 127—37 |
| 2,775,621 | 12/1956 | MacLean et al. | 260—635C |
| 2,917,390 | 12/1959 | Apel et al. | 260—635C |
| 2,989,569 | 6/1961 | Apel | 260—635C |

BERNARD HELFIN, Primary Examiner

J. E. EVANS, Assistant Examiner

U.S. Cl. X.R.

127—37